United States Patent
You et al.

(10) Patent No.: US 11,134,519 B2
(45) Date of Patent: Sep. 28, 2021

(54) METHOD AND WIRELESS DEVICE FOR TRANSMITTING RANDOM ACCESS PREAMBLE

(71) Applicant: GUANGDONG OPPO MOBILE TELECOMMUNICATIONS CORP., LTD., Guangdong (CN)

(72) Inventors: Xin You, Dongguan (CN); Ning Yang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 79 days.

(21) Appl. No.: 16/737,815

(22) Filed: Jan. 8, 2020

(65) Prior Publication Data
US 2020/0146065 A1 May 7, 2020

Related U.S. Application Data

(63) Continuation of application No. PCT/CN2019/072837, filed on Jan. 23, 2019.
(Continued)

(51) Int. Cl.
  *H04W 74/08* (2009.01)
  *H04W 48/16* (2009.01)
  *H04W 52/36* (2009.01)

(52) U.S. Cl.
  CPC ....... *H04W 74/0808* (2013.01); *H04W 48/16* (2013.01); *H04W 52/36* (2013.01)

(58) Field of Classification Search
  CPC ... H04W 74/808; H04W 48/16; H04W 52/36; H04W 74/0816; H04W 74/0825;
  (Continued)

(56) References Cited

U.S. PATENT DOCUMENTS

2011/0274040 A1* 11/2011 Pani .................. H04W 74/0833
                                                                 370/328
2013/0128733 A1*  5/2013 Lee ....................... H04W 74/04
                                                                 370/230
(Continued)

FOREIGN PATENT DOCUMENTS

CN       101848539 A    9/2010
CN       102291846 A   12/2011
(Continued)

OTHER PUBLICATIONS

International Search Report in international application No. PCT/CN2019/072837, dated Aug. 1, 2019.
(Continued)

*Primary Examiner* — Mewale A Ambaye
(74) *Attorney, Agent, or Firm* — Ladas & Parry, LLP

(57) ABSTRACT

A method for wireless accessing a node of a radio access network by a wireless device include the steps of launching by the wireless device a first access try to a node of said data network through a wireless access channel provided by said node, and if the first access try fails, launching by the wireless device a second access try to a network node through a wireless access channel after expiry of a second backoff time. The second backoff time is set in the wireless device in accordance with a priority value applying to the second access try.

18 Claims, 3 Drawing Sheets

Related U.S. Application Data

(60) Provisional application No. 62/621,810, filed on Jan. 25, 2018.

(58) Field of Classification Search
CPC .......... H04W 74/006; H04W 74/0841; H04W 74/085; H04W 74/0833; H04W 52/00; H04B 1/7075
See application file for complete search history.

(56) References Cited

U.S. PATENT DOCUMENTS

| | | | | |
|---|---|---|---|---|
| 2013/0244652 | A1* | 9/2013 | Park | H04W 74/002 455/435.1 |
| 2020/0221506 | A1* | 7/2020 | Jeon | H04W 74/0833 |
| 2021/0153257 | A1* | 5/2021 | Dinan | H04W 74/002 |

FOREIGN PATENT DOCUMENTS

| | | |
|---|---|---|
| CN | 102378364 A | 3/2012 |
| CN | 102711273 A | 10/2012 |
| CN | 102984806 A | 3/2013 |
| CN | 103379656 A | 10/2013 |
| CN | 104185298 A | 12/2014 |
| CN | 106982467 A | 7/2017 |
| EP | 2205037 A1 | 7/2010 |
| WO | 2013077622 A1 | 5/2013 |
| WO | 2013086874 A1 | 6/2013 |
| WO | 2016186542 A1 | 11/2016 |
| WO | 2017052144 A1 | 3/2017 |
| WO | 2017137060 A1 | 8/2017 |
| WO | 2019144886 A1 | 1/2019 |

OTHER PUBLICATIONS

Written Opinion for international application No. PCT/CN2019/072837, dated Aug. 1, 2019.
3rd Generation Partnership Project Technical Specification Group Radio Access Network; NR; Medium Access Control (MAC) protocol specification (Release 15) 3GPP TS 36.321 V15.0.0 (Dec. 2017).
The second Office Action of corresponding Chinese application No. 201980000469.6, dated May 15, 2020.
The third Office Action of corresponding Chinese application No. 201980000469.6, dated Jul. 15, 2020.
Asustek et al: "Details of prioritized random access for NR", 3GPP Draft; R2-1801430 Details of Prioritized Random Access_V6, 3rd Generation Partnership Project (3GPP) , Mobile Competence Centre; 650, Route Des Lucioles; F-06921 Sophia-Antipolis Cedex; France. vol. RAN WG2, No. Vancouver Canada; Jan. 22, 2018-Jan. 26, 2018 Jan. 12, 2018(Jan. 12, 2018, XP051386839.
3GPP TS38.321 v2.0.0, 3GPP TS-RAN ; NR ; MAC protocol specification; R15, published on Dec. 11, 2017.
3GPP TSG-RAN WG2 #99bis ; R2-1711394; LG Electronics Inc; Random Access Backoff and Access Barring, published on Sep. 28, 2017.
The Chinese First Examination Report of corresponding Chinese application No. 201980000469.6, dated Feb. 11, 2020.
The EESR of corresponding European application No. 19744258.5, dated Feb. 26, 2020.
The first Office Action of corresponding European application No. 19744258.5, dated Aug. 14, 2020.
The EESR of corresponding European application No. 21167399.1, dated May 14, 2021.

* cited by examiner

METHOD AND WIRELESS DEVICE FOR TRANSMITTING RANDOM ACCESS PREAMBLE

CROSS-REFERENCE TO RELATED APPLICATIONS

This application is a continuation of International Application No. PCT/CN2019/072837, filed on Jan. 23, 2019, which claims priority to U.S. Provisional Application No. 62/621,810, filed on Jan. 25, 2018. The disclosures of the aforementioned applications are hereby incorporated by reference in their entireties.

FIELD OF THE INVENTION

The disclosure relates to establishing a connection between a wireless device and a node of a network. Particularly, it may use features of the technical specification 3GPP TS 38.321 V15.0.0 (2017-12) of the 3rd Generation Partnership Project, technical specification group radio access network, NR medium access control (MAC) protocol specification (release 15), called "TS38.321" in the following.

PRIOR ART

FIG. 4 shows schematically a typical situation in relation to connectivity of wireless devices. 19a and 19b symbolize pathways such as roads crossing each other at an intersection 19c. Users have a variety of user equipment 13a, 13b. Together with users, these user devices move along the respective pathways. The user equipments 13 are mobile, wireless devices that require a physical and logical connection to a network for allowing data exchange, possibly including AAA (authentication, authorization, accounting).

The areas within which user equipments 13 shall be served may be covered by different types of base stations 11. 11d symbolizes a base station that broadcasts information in undirected manner, symbolized by hatched circle 12d indicating a more or less circular region within which transmission from base station 11d can be received with reasonable signal strength. Base station 11d sends uniformly in all directions ("broadcast"). Contrary thereto, base stations 11a, 11b and 11c send out directed radio waves ("beams"). These beams can be seen as lobe-like areas within which, again, signals from said respective base station 11a, 11b and 11c can be received with sufficient signal strength. What is said for sending out signals applies in the same manner for receiving signals. Base station 11d is adapted to receive signals from all kind of directions, i.e. is direction insensitive. Contrary thereto, base stations 11a, 11b and 11c are in their reception characteristics direction sensitive qualitatively in the same manner as in their transmission characteristics.

The respective lobes 12a, 12b and 12c or beams established by base stations 11a, 11b and 11c are of elongated shape and can, when installing the respective base stations, be adjusted and directed such that they cover, for example, one or more pathways. FIG. 1 shows the situation that a portion of pathway 19b is covered by a succession of three lobes or beams 12a, 12b and 12c which a mobile device 13 would pass as it travels along pathway 19b.

Assuming that mobile device or user equipment ("UE") 13a shown in FIG. 4 travels "northbound" (upward in FIG. 4) and assuming that it is in use, it is apparent that it will soon leave lobe 12b and reach lobe 12c. The already established connection must then be handed over such that it is no longer served by beam 12b, but rather by beam 12c. This is the situation of a "handover". Further, assuming that mobile device 13b is situated more or less in the middle of lobe 12b and is switched on there, it has to establish a new connection to an accessible base station. In the example shown, accessible are broadcasting base station 11d and beam sending base station 11b.

Generally speaking, the connectivity considerations as described in this specification shall be deemed applicable to both broadcasting base stations as exemplified by base station 11d and its covered region 12d, and to beams 12b, 12c, 12d as exemplified for base stations 11a, 11b and 11c, if not said otherwise. But likewise, depending on circumstances, the described thoughts and features may be seen as applying to only one of them, i.e. only the broadcasting station 11d or only the beam transmitters 11a, 11b and 11c.

Establishing a physical and logical connection between a user equipment 13 and a base station 11 may follow a sequence of steps, amongst them establishing timely synchronization amongst a base station and a user equipment, timely organizing the user equipments amongst each other in their wireless activities with respect to one or more of the base stations and many other steps.

When a user equipment wants to establish a connection to a new node 11, it must be assumed that it has no knowledge about activities of other user equipment dealing with the same node. It may, however, have knowledge about certain properties of the wireless environment within which it resides. FIG. 5 shows the situation schematically. The information known to the UE may, for example, have been received earlier by said user equipment from broadcast information.

For establishing a connection with a new node, a user equipment will send out a first message to the new node including identification data of the user equipment and other information. In TS38.321, this first message is called "preamble", and it is sent out in a random access ("RA") approach.

FIG. 5 shows a situation that may occur. The synchronization of plural user equipments to a particular node may lead to the situation that different user equipments try to access the same node at the same instance. In FIG. 5, this, is shown for S1 where a first user equipment UE1 sends a first preamble in a first random access try RA1, shown as event UE1-RA1. It is assumed that it is more or less at the same time as a second user equipment UE2 sending a second preamble in its first access try RA1, shown as event UE2-Ra1. It is assumed that they cannot both properly be received and/or processed in the targeted node. It may be that none of them is properly received and decoded. It may also be that only one of them, for example that with the higher signal strength, is properly received and decoded. In TS38.321 this kind of approaching a node is called "random access" (RA). Assuming that both access tries are properly received and decoded in the targeted node, said RA tries receive a respective response, called "random access response" (RAR) in TS38.321. But even if both RAs are almost or practically concurrently sent out, both preambles from both user equipments UE1 and UE2 may be received and decoded in the targeted node and may receive a respective response, shown as RAR1 and RAR2. These responses are specific for the respective user equipment.

Said response may tell one or more of the user equipments that their request for establishing a connection can, for certain reasons, presently not successfully be terminated, and the user equipments should retry access later, this leading to RA2 for each of the UEs, and, still later possibly even RA3 etc.

It is known that in the case of such instructed retries user equipments adjust backoffs for such retries for avoiding the situation that plural user equipments retrying access do this at the same time and thus block each other systematically. According to certain strategies, different user equipments receive, through individual RARs, different backoffs for distributing or time-spreading their retry timings on the timeline. In FIG. 5, these different backoff times are shown as delays of different length between the respective RAR1/RAR2 and a subsequent respective retry UE1-RA2 and UE2-RA2. The delays are randomly assigned by the base station node, communicated to the UEs and are actively controlled waiting limes of a user equipment UE, before sending out a further access try, such as a further preamble.

In the known approaches, for setting the backoff time all user equipments are treated equal in a sense that at least on a statistical basis they receive same chances for certain backoff times. According to TS38.321, the user equipment determines the specific values from a table accessed in accordance with a value received through the RAR and set by the base station. The prior art as shown in FIG. 5 has the effect that RAs of a UE subsequent to the first RA1 are time spread against each other and thus will less likely get in conflict with each other. But, in FIG. 5, the UE1-RA2 or UE2-RA2 may collide in time with first RA1 of UEs not known so far, i.e. either block them or be blocked by them.

Continuous observation of network load, quality of service, user satisfaction and the like has, however, shown that treating all user equipments equal regarding assignment of backoff times is not the best possible approach. For example, it may be that a user equipment has already a connection established and wants to hand it over to a new node. Then, it is desirable to make such a handover such that the handover is not further compromised by access difficulties of the user equipment to the new node. Similar thoughts apply to recovering a connection that collapsed within a beam or a broadcasting region for some reasons. Also, such recovery should not be compromised by additional difficulties such as access difficulties of the user equipment to the targeted node. In other words, technical necessities or constraints may cause that certain access situations are more sensitive towards latency (connection fail or delay) situations than other access situations.

DISCLOSURE OF THE INVENTION

Thus, situations are conceivable where it might be desirable to treat user equipments differently or such that certain ones of the user equipments are prioritized over others. This desire accrues from the recognition that the collapse of a connection or the inability to quickly reestablish a collapsed connection is much more detrimental to user satisfaction and quality of service than, for example, a slightly prolonged waiting time or "latency" in the course of establishing a new connection.

Accordingly, it is an object of the disclosure to provide a random access method, a method for a wireless accessing a node, a wireless device and a node apparatus capable of a well-adapted handling of access requests in view of their respective necessity.

This object is accomplished by the features of the independent claims.

Generally speaking, the disclosure aims at establishing a priority mechanism amongst subsequent random access tries (RA2, RA3, . . . ) of plural UEs, and/or aims at establishing a priority mechanism for subsequent random access tries (RA2, RA3, . . . ) compared to initial/first random access tries RA1. Priorizing can then mean to allow the priorized random access tries RAs to get through earlier or with higher likelihood, or vice versa to delay the not-priorized RAs behind the priorized ones for making conflict less likely.

In one aspect, the disclosure is a method as defined by TS38.321, modified by the following indications.

Priority requirements of an access request when initiating an RA (random access) procedure can be considered when the value of a backoff parameter of a first access try RA1 is, when traffic load is high, not 0 ms anymore, but is a certain value higher than 0 ms, e.g. a value higher than 1 or 2 or 5 or 10 or 20 ms and/or a value lower than 100 or 50 or 20 or 10 ms. This value may be held as a variable ra-InitialBackoff. Its value may also be set in accordance with the known time-spreading backoffs according to table 7.2-1, particularly for placing RA1 delayed by the initial backoff later in time than subsequent backoffs RA2, Ra3, . . . delayed in known manner according to table 7.2-1 But when the cell load is very low and UEs (user equipment, mobile device) don't require to backoff for avoiding collision, the initial backoff for RA1 according to the initial backoff parameter value is not needed. The settings may then all together be such that when an RA procedure is initiated, if the initial value of backoff parameter is set in the UE, the UE shall set the PREAMBLE_BACKOFF to the initial value of the backoff parameter. With such a setting a preamble of an RA1 request may be sent out.

Accordingly, a random access method in a radio access network that may be configured according to 3GPP TS 38.321 of December 2017, as far as not modified by the following indications, comprises the following steps performed in a wireless device:

a.) in a first step of initializing the transmission of a random access preamble from the wireless device to a network node, setting an initial backoff time value larger than 0, and b.) transmitting the first random access preamble under observance of the initial backoff time value.

When an RAR (random access response) is received, there are two options for the backoff parameter setting:

If a BI (backoff indicator) is included in the received RAR, UE should set the PREAMBLE_BACKOFF based on the priority of the RA procedure. Priority may be considered by modifying the backoff time value indicated by the backoff indicator in accordance with priority. The modification may be a multiplication by a priority based factor. The factor may be between 0 included and 1 included and may be held as a variable ra-BackoffMultiplier. The so modified backoff time value may then be used for setting PREAMBLE_BACKOFF.

If the received RAR does not include a BI, which means the cell load is low enough to guarantee the UEs reattempt RA without backoff, UE should set the PREAMBLE_BACKOFF to 0.

The following preambles after RAR may then be set under observance of said backoff value.

The above teaching may lead to a partial change in Technical Specification 3GPP TS 38.321 V15.0.0 (2017-12) 38321 of December 2017:

1. In 5.1.1 "Random Access procedure Initialization":
   When the Random Access procedure is initiated, the MAC entity shall flush the Msg3 buffer, set the PREAMBLE_TRANSMISSION_COUNTER to 1, set the PREAMBLE_POWER_RAMPING_COUNTER to 1, and set the PREAMBLE_BACKOFF to ra-InitialBackoff and optionally at the end of 5.1.1 preferably immediately before, and at same decision level as, "perform the Random Access Resource selection procedure (See subclause 5.1.2)":

delay the subsequent Random Access Preamble transmission by the backoff time indicated by PREAMBLE_BACKOFF.

2. In 5.1.4 "Random Access Response reception":

else if a downlink assignment has been received on the PDCCH for the RA-RNTI and the received TB is successfully decoded:

if the Random Access Response contains a Backoff Indicator subheader, set the PREAMBLE_BACKOFF to the product of ra-BackoffMultiplier and the value of the BI field of the Backoff Indicator subheader using Table 7.2-1.

else: set the PREAMBLE_BACKOFF to 0

The backoff time is an actively controlled waiting time before sending out a preamble or starting preparation thereof. Its start may be defined by a factual readiness of a user equipment to send out a preamble or by a certain absolute point of time such as a synchronisation time pattern. Its ending may trigger the random access resource selection or the random access preamble transmission.

Insofar, a random access method in a radio access network preferably configured according to 3GPP TS 38.321 of December 2017, as far as not modified by the following indications, and preferably configured as described above, comprises the following steps performed in a wireless device:

a.) transmitting a first random access preamble, b.) setting a backoff multiplier, c.) after receiving a random access response on live transmission of the first random access preamble, if the received random access response includes a backoff indicating subheader, determining a first backoff time value (btv1) in accordance with information in said subheader, determining a second backoff time value (btv2) by multiplying the first backoff time value and said backoff multiplier, and d.) transmitting a second random access preamble under observance of the second preamble backoff time value (blv2).

In a broader description, the disclosure is a method for wireless accessing a node of a radio access network by a wireless device, comprising the steps of launching by the wireless device a first access try, particularly a first random access try, to a node of said data network through a wireless access channel provided by said node under observance of an initial backoff value, and if the first access try fails, the wireless device launches a second access try to a network node through a wireless access channel after expiry of a second backoff time, wherein the second backoff time is set in the wireless device in accordance with a priority value applying to the second access try. Determining the second backoff time can be made in accordance with information received in response to the first access try.

In this specification, the indications of "sending a preamble" and launching "an access try" and sending an "access request" or "RA request" may mean the same and may mean or at least include a random access preamble transmission as described in 5.1.3 of TS38.321.

At a given point in time, a node/base station has some explicit and/or implicit knowledge on expected traffic from $2^{nd}/3^{rd}/\ldots$ random access ("RA") tries expected in the near future as follow-ups of earlier $1^{st}$ RA tries issued from several UEs and received by the node/base station. It can set an initial backoff for $1^{st}$ RA tries in accordance with such knowledge for delaying such $1^{st}$ RA tries.

The mentioned initial backoff time value or variable ra-InitialBackoff has the purpose of generating a time window not occupied by initial access requests that can be used for, or is already known to be occupied by, sending out prioritized other preambles or access tries, particularly subsequent access tries. Then, initial access tries or access requests in a random access approach are less likely to cause contention with prioritized access requests so that these prioritized access requests brave higher chances for being successful because they are less likely blocked by initial preamble transmissions or access tries because these are sent out with the mentioned initial backoff.

After the initial random access try/preamble transmission RA1, subsequent preamble transmissions or random access retries RA2, RA3, ... can be sent out with a modified backoff value. The modified backoff value may be a backoff time value shortened compared to that known in the prior art, particularly known from said TS 38.321. This may, for example, be accomplished by determining for such a RA retry or transmission of a further preamble a first backoff time as it is known in the prior art, but shortening it by multiplying the so obtained first backoff time value with a backoff multiplier between 0 and 1. Actually, settings may be such that the mentioned multiplication is always made. If the backoff multiplier is 1, the backoff timing is that known from the prior art. If, however, the backoff multiplier is smaller than 1, for example 0.5 or 0.2, the corresponding backoff time values are shortened compared to those known from the prior art so that a retry or subsequent preamble transmission is prioritized in that its backoff value is shortened compared to that known from the prior art. The backoff multiplier may be set to 0 so that backoff timing is suppressed to 0 for prioritized access request. But likewise, the backoff multiplier may be a small value for example between 0.1 and 0.5, such as 0.3. This brings the generally used known time-spreading backoff values to 30% of their values so that they are significantly shortened compared to not prioritized retries/preamble transmissions.

Using the shortened backoff times, generated for example by multiplying the prior art backoff times with the backoff multiplier smaller than 1, in subsequent preamble transmissions is particularly advantageous in combination with using the initial backoff for the first preamble transmission. The initial backoff value delays the first access try/preamble transmission for the defined initial backoff time and thus ensures that the related time slots or timing areas are less likely occupied by initial access tries/initial preamble transmissions. Then, it is less likely that access contention will occur so that access success is more likely to happen.

The backoff timing for an access retry or for a second/third/ ... preamble transmission can be set in accordance with a response on the anteceding access try/preamble transmission. Particularly, the response on an access try/preamble transmission may be a random access response (RAR). Such a response may include a backoff indicator (BI). The backoff indicator may be part of a backoff subheader of the RAR. Said response on an access try/first preamble transmission may contain both information on general backoff for avoiding access contention, and may include information on prioritized backoff timing setting. Said information on prioritized backoff timing setting may be the backoff multiplier included in said response sent from the node to the requesting user equipment. Accordingly, the requested node has knowledge on the traffic situation around it and can set backoff timings and priority information as required and send it in its response to the requesting mobile device/user equipment UE. So, for example, a RAR may contain a conventional backoff indicator used for accessing table 7.2-1 as known from TS38.321, and my contain a multiplier used for processing the values retrieved from said table. The requesting user equipment will receive the response, will evaluate it and will use the communicated information properly. Particularly, it can, for example, first set a regular backoff timing in accordance with related information in said response, and can further modify it towards prioritized backoff timings by applying the backoff multiplier.

More in detail, use of the backoff multiplier bm can be to multiply a conventionally obtained first backoff time value btv1 by bm to obtain a priorizing second backoff time value btv2, i.e.

btv2=btv1*bm with 0≤bm≤1

The base station may set the backoff multiplier to 0 or 1 or a value inbetween and communicate it to a mobile device. There, the multiplication can be executed. A bm=0 would lead to a switchoff of the backoff timing. A bm=1 would lead to regular backoff control without priorization. A bm value between 0 and 1, such 0.2 or 0.4, would lead—in average—to a shortened and thus prioritized backoff. Accordingly, the base station can control backoff to be normal, prioritized or switched off by appropriately setting the bm value and communicating it to the mobile device, preferably in a response on a first access try/preamble transmission, preferably in a RAR, preferably in a backoff subheader as described in TS38.321. The backoff subheader may also communicate information for setting the regular backoff timing btv1, particular setting a backoff indicator value BI in the subheader, which can be used for determining btv1 in the mobile device, e.g. by referencing table 7.2-1 mentioned in TS38.321. Further, the mobile device may for itself be suited for switching off backoff for access retries after the first try if no backoff indication from the base station is received in response to the first try.

The base station can determine regular backoff (BI) and the backoff multiplier bm in accordance with circumstances known at the base station, such as traffic load, statistics, and others.

A node may also send a response on an access request without backoff information. It can, for example, use this option when traffic is low so that no backoff is required. A requesting user equipment can detect the fact that a response on an earlier access/preamble transmission does not include a backoff indication BI and can react in an appropriate manner, for example by setting a backoff timing to a predetermined value, such as 0 or another small value, e.g. below 1 ms or below 5 ms.

A further method, optionally combined with the above described approach, for prioritizing the access request/preamble transmission of a user equipment over those of other user equipments is to provide the prioritized user equipment with higher sending power values. This setting of priorization can be made, for example, with the response sent on a first access request, i.e. the RAR as mentioned earlier. Such an increased sending power value can be provided to prioritized user equipments and can be used there. It may replace a standard lower power value used as a default for determining the sending power of access requests/preamble transmissions.

Instead of communicating a higher priorizing sending power in an RAR, it can be communicated or set also through other mechanisms depending on situation and circumstances. In any case, the user equipment is aware of the set sending power and will use and implement it. The overall system uses then different settings for sending power, namely lower powers for not prioritized access requests, and higher sending powers for prioritized access requests.

A node of base station can be adapted to send one or more of an initial backoff value, a backoff multiplier and a power value to a user equipment. All said mentioned values can be set in accordance with priority determinations as explained. The initial backoff can be broadcast or communicated to a user equipment in advance, for example as part of system information. The backoff multiplier and the power value can be communicated to the user equipment in a response on an anteceding access request/preamble transmission or can be communicated or set earlier, depending on circumstances.

The set or known power value can be used in a power ramping approach, i.e. in an approach of increasing the sending power for each of a sequence of preamble transmissions/access tries. This may, for example, be made by multiplying the stored or received power value by the number of the current preamble transmission/access try. When a comparatively low power value is stored, also the ramping across the various tries will be less steep. Vice versa, if a higher power value is stored, also the related power ramping is steeper and leads to prioritization of the access requests with the higher sending power in that they are more likely to be "heard" by a node.

As already said, values such as backoff multiplier and sending power value can be set in accordance with priority considerations of the related access requests. Access requests used for maintaining/handing over/reestablishing an existing connection can be prioritized over access requests for new connections, and would accordingly receive a relatively higher power value and/or a relatively lower backoff timing, the latter, for example, represented by a backoff multiplier smaller than 1. But also other situations or circumstances than maintaining a connection can lead to higher priority. For example, an agreed quality of service may lead to a prioritization of the related access requests. Likewise, application layer information may lead to a high priority determination. Further, statistical considerations on the likelihood of access contention may lead to certain priority settings.

Generally speaking, priority settings may be made in a node targeted by a user equipment for access and may be communicated from said node to the user equipment, or can be made in the user equipment itself depending on circumstances.

Sending the preambles/access tries can be made through an access channel provided by the targeted node. It may be a contention based access channel and/or a random access channel. The access try may comprise the sending of a preamble from the mobile device to the network node.

The initial backoff time is a value larger than 0 ms or larger than 1 ms or 2 ms of 5 ms or 10 ms or 20 ms or 50 ms. The initial backoff time may be smaller than 1000 ms or 500 ms or 200 ms or 100 ms or 50 ms.

The backoff multiplier may for prioritized access requests be a factor between 0 included and 1 excluded. It may be larger than 0.1 or larger than 0.2 or larger than 0.5, and may be smaller than 1 or 0.8 or 0.5. It may be applied to backoff timings determined under conventional approaches.

The power value used for a prioritized access request may be at least 1.2 or 1.5 or two times that of a non-prioritized access request.

"Radio" access network as used herein may mean a wireless access through exchange of information by electromagnetic waves.

A wireless device configured to participate in a random access method may be configured according to TS38.321 of December 2017, as far as not modified by the indications given above or in the following. It may comprise initializing means for initializing the transmission of a random access preamble. It may set and hold an initial backoff time value larger than 0. It further includes transmitting means for transmitting a first random access preamble under observance of the mentioned initial backoff time value.

Further, a wireless device configured according to TS38.321 of December 2017, may be configured as described above and may be further modified as follows: Initializing means for initializing the transmission of random access preambles may be adapted to set or store or hold a backoff multiplier. Transmitting means are adapted to transmit a first random access preamble. Receiving means are adapted to receive a random access response on the transmission of the first random access preamble and are configured to determining a backoff time value in accordance with information in a possibly received backoff indicating sub-header. The transmitting means are further configured to transmit a second random access preamble under observance of the second preamble backoff time value.

A wireless device for a wireless access to a node of a radio access network comprises means for launching a first access try to said node through a wireless access channel provided by said node, means configured for launching a second access try, if the first access try fails, after expiration of a second backoff time. It comprises further means for setting the second backoff time in accordance with a priority value applying to the second access try.

A node apparatus configured according to TS38.321 of December 2017 may have the following additions and/or modifications: it comprises means for transmitting to a user equipment one or more of an initial backoff value, a backoff multiplier value and a power ramping step value to a wireless device. These values are then used as described above.

Many of the aspects of the disclosure will be implemented by adapted software. Accordingly, a data earner with computer readable code thereon implementing, when executed, the above methods and/or rendering the mentioned devices and apparatuses are also part of the disclosure.

BRIEF DESCRIPTION OF THE DRAWINGS

In the following, features and embodiments of the disclosure will be described with reference to the attached drawings, in which.

DETAILED DESCRIPTION

In FIG. 1, schematically a timeline is depicted. It comprises marked points of time S1, S2, S3, S4, . . . as also described earlier, in parts, for FIG. 5. FIG. 1 shows also events UE1-RA1, UE2-RA1, RAR1 and RAR2 as described with reference to FIG. 5.

It is pointed out in this respect that a user equipment may be any kind of digital device using wireless access to a network. It may be a mobile phone, a PDA, a notebook or the like. But likewise, it may also be an IOT ("internet of things") device seeking and requiring wireless access.

Figure 1A:
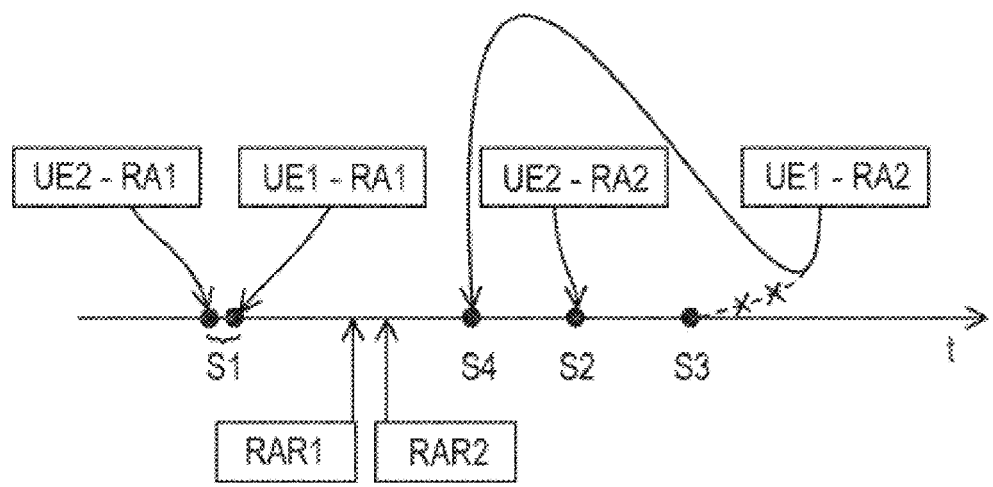
FIG. 1a shows backoff settings for priorizing subsequent access tries amongst each other.
Figure 5:
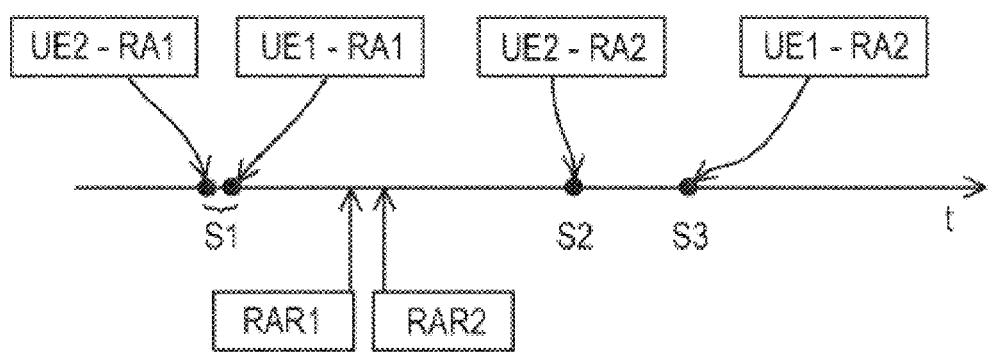
FIG. 5 shows prior art settings.

In FIG. 1a, the first preamble transmissions of the first and second user equipments UE1 and UE2 receive random access responses RAR1 and RAR2 qualitatively as described in FIG. 5 above. But content may be different. It is assumed that, for some reasons. UE1 should be priorized over UE2. For example, UE2 may request a new connection, whereas UE1 is trying to recover an already existing connection. Then, UE2 is served also quantitatively (by RAR2) as before, leading to the same result. But UE1 may receive, in its RAR1, a priorizing indication, such as, in addition to the known priorizing mechanism (communication of a backoff indicator for table 7.2-1 to UE1) a backoff multiplier between 0 and 1, e.g. 0.4. UE1 retrieves then a regular backoff time value in accordance with BI from table 7.2-1. Then it multiplies said conventional backoff time value by the multiplier and has, thus, a shorter backoff lime to wait for issuing a subsequent RA try (such as RA2). In effect, it may then be able to issue its RA2 UE1-RA2 earlier than UE2 sending its UE2-RA2. Thus, the first user equipment can send out a second preamble (random access try—RA2) with another backoff timing compared to prior art. When a node/base station knows that a priorized UE is to be served, it may assign "longer" conventional backoff times to not priorized UEs for generating a free time slot that can be occupied by one or more priorized UEs.

As already said, the regular backoff values for subsequent preamble transmissions/access tries may be determined in accordance with table 7.2-1 of TS38.321. Then, they are spread out into a range between 5 ms and 1920 ms. One of these values would be btv1 in the above mentioned formula and could be the backoff timing set for the second access try of the not prioritized UE2, i.e. for UE2-RA2. Said backoff timing can be determined in the user equipment from information received through RAR, particularly backoff information therein, more particularly in a backoff sub-header.

If multiplied by a backoff multiplier bm of, say, 0.4, the above range would be compressed into btv2 values from 2 ms to 708 ms. One of them would be set as a backoff for the next access try RA2 of UE1, i.e. for UE1-RA2. If bm is set to 0, corresponding values 0 appear as btv2.

Figure 1B:
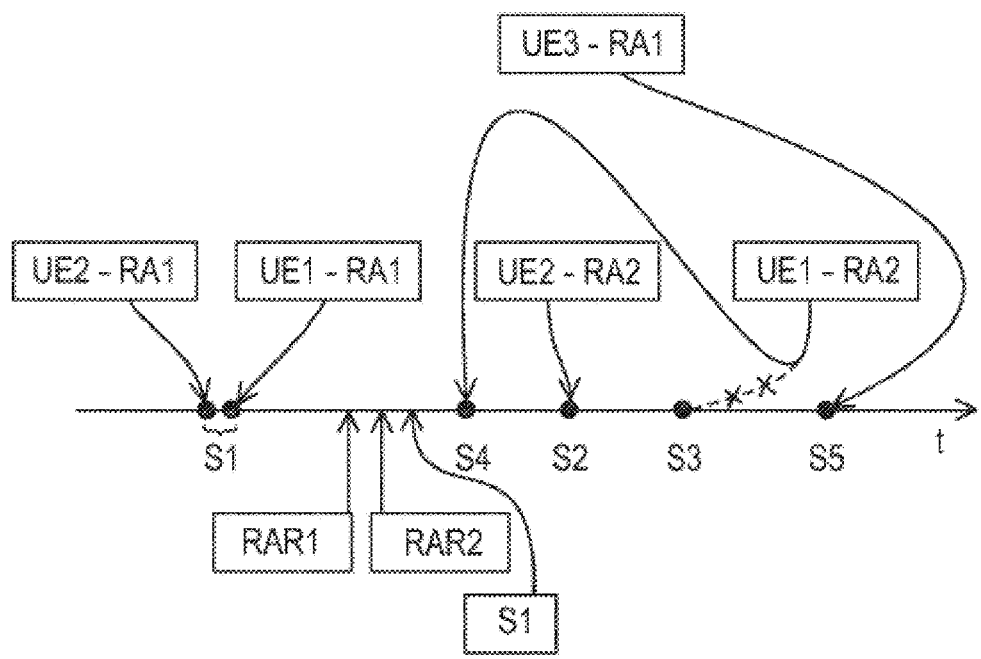
FIG. 1b shows backoff settings for priorizing subsequent access tries over a first access try.

FIG. 1b shows the effect of an initial backoff. In FIG. 1b, the initial backoff is applied to UE3.

At a given point in time, a node/base station has some explicit and/or implicit knowledge on expected traffic from $2^{nd}/3^{rd}/\ldots$ random access ("RA") tries expected in the near future as follow-ups of earlier $1^{st}$ RA tries issued from several UEs (UE1, UE2 in FIG. 1b) and received by the node/base station. Explicit knowledge may come from related monitoring structures in the node/base station collecting information on such expected traffic. Implicit knowledge may be reflected by the BI subheaders sent out by the node/base station which set dispersed backoffs for expected $2^{nd}/3^{rd}/\ldots$ RA tries ("subsequent backoffs" in the following). When it is foreseeable for the node that many such $2^{nd}/3^{rd}/\ldots$ RA tries will come in the near future, it can set and broadcast an initial backoff to be observed for potential future $1^{st}$ RA tries, for delaying these $1^{st}$ RA tries to a time patch later than the time patch of the expected $2^{nd}/3^{rd}/\ldots$ RA tries. An implicit indicator of expected network traffic is the sending out of BI subheaders including the subsequent backoff indicator for said $2^{nd}/3^{rd}/$ . . . RA tries, the indicator referring to table 7.2-1 of TS 38.321.

In FIG. 1b, it is assumed that the base station node knows at the time of sending RAR1 and RAR2 that the time patch around S4 (when considering the backoff multiplier)-S2-S3 (when not considering the backoff multiplier) is occupied by some RA2 from various UEs. It then could decide or be configured to send out (broadcast) an initial backoff to be observed by UEs when issuing a respective $1^{st}$ RA try that delays the incoming next first RA tries RA1 to a time patch behind the S4-S2-S3 area. This is shown in effect for UE3. Assuming that conventionally it would have sent UE3-RA1 more or less concurrently with UE2-RA2, it is delayed, by the initial backoff, to a time S5 later than the "occupied" S4-S2-S3 patch, thus increasing the likelihood that subsequent RAs, priorized ones amongst them (such as UE1-RA2) are successful.

Accordingly, an approach for setting an initial backoff could be to set it in correlation with at least one other assigned backoff value, particularly in accordance with a backoff value assigned for a subsequent access try. It may be set on a value correlating to the value of a subsequent backoff for $2^{nd}/3^{rd}/$ . . . RA tries. This may be made in view of such subsequent backoffs as already known from TS38.321 (corresponding to the S2-S3 time patch) or in view of the modified settings as described above for priorizing RA tries (i.e. the S4-S2 time patch). For example, the initial backoff could be set to be larger than the largest recently set subsequent backoff with or without consideration of the modification by the backoff multiplier. Then the initial backoff to be observed for potential future $1^{st}$ RA tries RA1 is larger than the largest subsequent backoff of the expected future $2^{nd}/3^{rd}/$ . . . RA tries and would delay such a potential $1^{st}$ RA try until after the known $2^{nd}/3^{rd}/$ . . . RA tries. But given the statistical nature of the events, also other correlation patterns than "larger than the largest" can be implemented.

The decision on whether and how to set an initial backoff can be made in a node/base station. From there, it can be broadcast to the UEs for observance there.

Setting the initial backoff time value in the UE can be made with respect to table 7.2-1 of TS38.321 in that the UE receives in a message broadcast from the base station, or obtains in other manner, a value for accessing said table and retrieving a time value from said table and use it as an initial backoff. An approach could then be to use, for the initial backoff indicator, the largest of the recently used subsequent backoff indicators. But the initial backoff cart also be communicated directly as a time value. And also other correlations patterns amongst said initial and subsequent backoff indicators may be followed.

Once an initial backoff (indicator) is set and broadcast, explicit or implicit revision strategies for the initial backoff may be followed for not "always" having an initial backoff. The revision strategy may be implemented in the node/base station and/or in the UE. The node may revise the initial backoff setting from time to time and may determine and broadcast updated values, determined as mentioned above. It may also set/broadcast the initial backoff to 0 (zero). The UE may reset the initial broadcast when receiving, an RAR without a BI subheader, as this can be seen as an implicit indication of low traffic.

Figure 2:
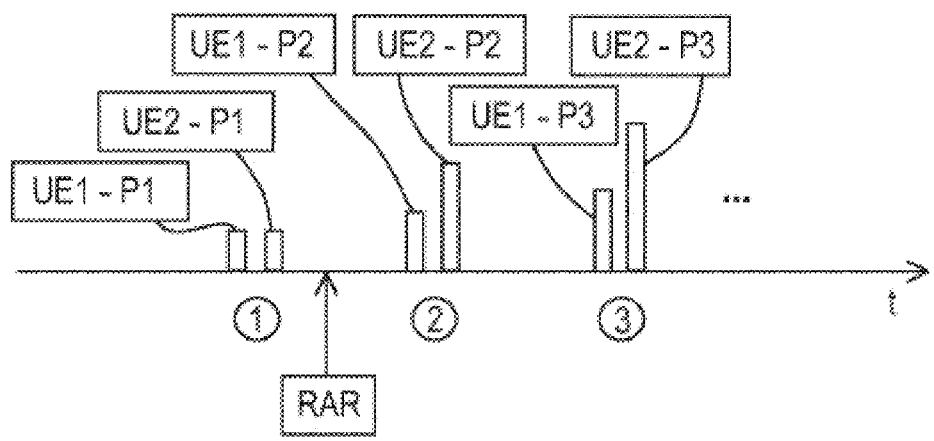
FIG. 2 shows power settings.

FIG. 2 shows power control according to the disclosure. Schematically, a timeline is shown. Along said timeline, access tries of prioritized user equipment UE2 and of a regular user equipment UE1 are shown. In their first access try, which may be a random access try and may, include sending out a respective first preamble, they may have same sending power, symbolized by substantially same height of the respective bar. The two tries UE1-P1 and UE2-P1 may then receive respective responses RAR. The prioritized user equipment UE2 would then be informed on a higher power value than UE1 and would use this higher value for determining sending power of future access tries/preamble transmissions. The result is shown in the middle of FIG. 2 as UE1-P2 and UE2-P2 where both user equipments UE1 and UE2 send out their respective second preamble P2. The respective sending power may have been determined by multiplying the respectively applying power value, for example, by the number of access try ("2" in the middle of FIG. 2). Then, the second user equipment UE2 has a correspondingly higher sending power. Then, it is more likely to be "heard" than the not prioritized user equipment UE1.

In this manner, retries could continue. For both user equipments sending power can increase for making it more likely for them to be heard. But for the prioritized user equipment UE2, the increase is stronger than that of the not prioritized user equipment UE1.

Figure 3:
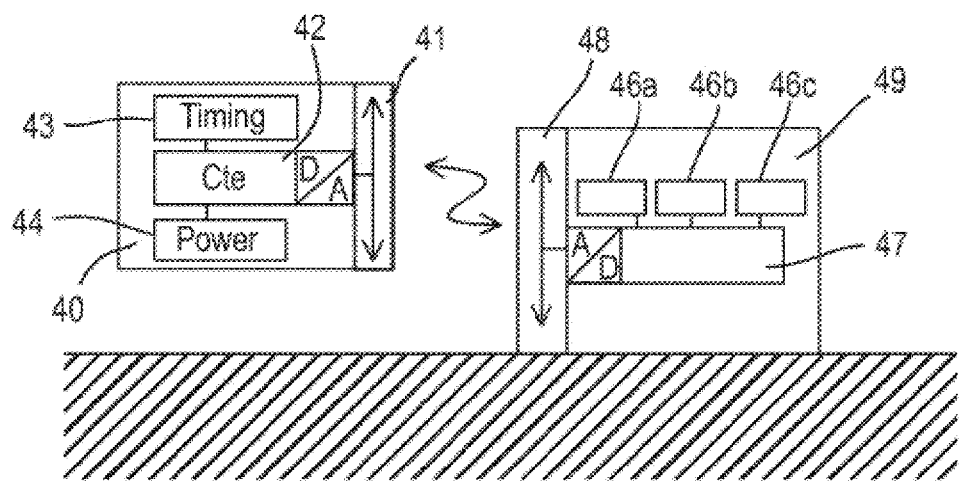
FIG. 3 shows schematically a mobile device communicating with a node.
Figure 4:
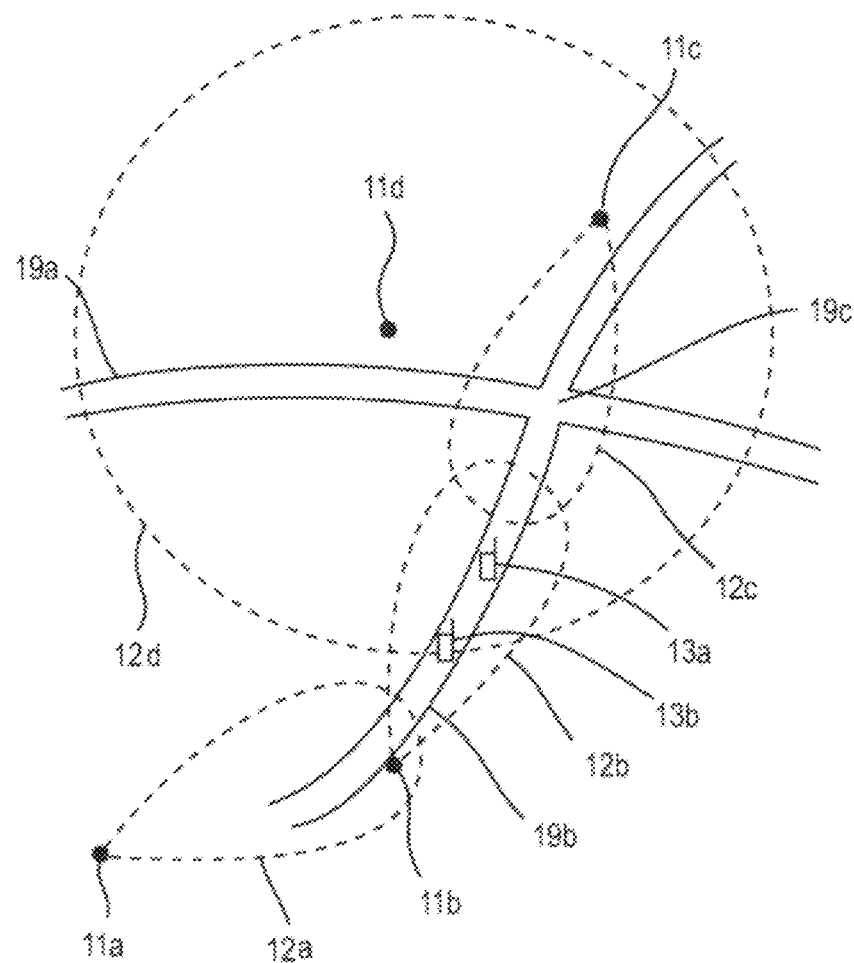
FIG. 4 shows a situation in which the disclosure can be applied.

FIG. 3 shows most schematically a user equipment 40 communicating with a base station or node 49. The user equipment 40 may be a portable or mobile device or any other kind of apparatus seeking wireless access, including IOT enabled devices. The node/base station may be a stationary device or may itself be mobile. The mobile device 40 has an antenna 41 for sending and receiving electromagnetic signals. It has a controller 42 operating on a digital basis and being connected in appropriate manner with the antenna for sending and receiving signals. A digital analog conversion and appropriate drivers and controllers are provided.

Controller 42 is a digital device of significant control and computing power. The mobile device 40 comprises timing setting means 43 for controlling timing of sending signal, amongst them particularly the timing of preamble transmissions in the course of random access procedures as described earlier. Particularly, component 43 implements the initial backoff and the later consideration of a backoff multiplier as described. It implements what is shown in FIG. 1.

Power controller 44 implements what is shown in FIG. 2. It may set power values in dependence on whether an access request is prioritized or not and may, thus, follow for example the UE1 sequence as shown in FIG. 2 for a not prioritized access try, or the UE2 sequence shown in FIG. 2 for a prioritized access request.

The mobile device 40 uses for its timing control and for its power control the respectively held data, particularly the initially backoff value, the backoff multiplier and the power value.

The base station 49 has an antenna 48 for sending and receiving signals, particularly for exchanging signals with a mobile device such as mobile device 40. It has a controller 47 connected to the antenna 48 in appropriate manner, including A/D conversion, drivers, controllers and the like.

Amongst many other—not shown—components the base station 49 has one or more of registers 46a for holding an initial backoff, 46b for holding a backoff multiplier and 46c for holding a sending power value. It is pointed out that these values may be particular for a particular mobile device 40. Correspondingly, if plural mobile devices 40 are to be served by a base station 49, plural sets of registers 46a to 46c as shown in FIG. 3 are provided. Beyond said registers, the base station 49 may have means for determining the respective values. The base station 49 may have priority determinations for determining the priority of an access request of a base station, and may have means for determining one or more of initial backoff, backoff multiplier and sending power.

It is pointed out in this context that priority determination may be dual in a sense of assigning two types of priorities, such as "normal" and "high", or it may be more gradual by deciding and assigning three or plural priority levels, such as "normal", "elevated", "high", "top". Corresponding to the number of priority levels a number of different backoff multipliers or power values can be determined and communicated.

Priority of an access request can, for example, be determined in base station 49 in accordance with applying circumstances. Circumstances may be connectivity situation, traffic situation, QoS considerations and others. In accordance with a determined priority, the mentioned values of backoff multiplier and/or sending power value can be determined and written into one of the mentioned registers 46.

The initial backoff 46a may also be subject to certain determinations. It can be communicated to user equipments for example by broadcasted system information.

A second, further access try/preamble transmission becomes necessary if a first/former access try/preamble transmission did not have the desired effect of firmly establishing a logical connection between mobile device and base station. This may be called "access failure" or "unsuccessful" access procedure. These determinations may be made in accordance with the procedures defined in TS38.321.

Part of the described disclosure is also a data carrier holding computer readable and preferably executable code thereon that, when executed or used in execution, provides the method as described earlier or implements a device or apparatus as described earlier.

Features described in this specification and also in TS38.321 shall be deemed combinable with each other also if their combination is not expressly described, to the extent that this combination is technically feasible. Features described in a certain context, embodiment, figure or claim shall be deemed separable from this embodiment, figure, claim or context and shall be deemed combinable with of other figures, claims, contexts of embodiments, to the extent that this is technically feasible. Description of a method or a method step shall be understood also as a description of means and/or program instructions for implementing the method or method step or vice versa.

LIST OF REFERENCE NUMERALS

11a-11d base stations
12a-12c beams
12d broadcast area
13 user equipment
19a, 19b pathways
19c intersection
40 mobile device
41 antenna
42 controller
43 timing controller
44 power controller
46a-46c registers
47 controller
48 antenna
49 base station
RA1 first random access try
RA2 second random access try, subsequent random access try
RAR random access response

What is claimed is:

1. A random access method in a radio access network, comprising the following steps performed in a wireless device:
    a.) transmitting a first random access preamble,
    b.) setting a backoff multiplier,
    c.) after receiving a random access response on the transmission of the first random access preamble, if the received random access response includes a backoff indicating subheader, determining a first backoff time value (btv1) in accordance with information in the subheader, determining a second backoff time value (btv2) by multiplying the first backoff time value and the backoff multiplier, and
    d.) transmitting a second random access preamble under observance of the second backoff time value (btv2);
    the method further comprises the following steps performed in the wireless device:
    e.) in a step of initializing the transmission of a random access preamble from the wireless device to a network node, setting a power value, and
    f.) transmitting a random access preamble under observance of the power value.

2. The method of claim 1, wherein in step c.), the second backoff time value is set to a predetermined value, preferably 0, if the received random access response does not include a backoff indicating subheader.

3. The method of claim 1, comprising the following steps performed in the wireless device:
    a.) in a first step of initializing the transmission of a random access preamble from the wireless device to a network node, setting an initial backoff time value larger than 0, and
    b.) transmitting the first random access preamble under observance of the initial backoff time value.

4. The method of claim 1, in which one or more of an initial backoff time value, the backoff multiplier and the power value are sent to the wireless device before the first initializing step, wherein one or more of these values is determined in accordance with priority considerations of a wireless access.

5. The method of claim 1, in which one or more of an initial backoff time value, the backoff multiplier and the power value are determined in accordance with priority considerations of an access requests.

6. The method of claim 1, in which one or more of an initial backoff time value, the backoff multiplier and the power value are sent to the wireless device by the random access response on an preceding transmission of the random access preamble, wherein one or more of these values is determined in accordance with priority of a wireless access.

7. The method of claim 2, in which the backoff multiplier is set to a value smaller than 1 in case of high priority of the intended access request, and can be set to 1 in case of a low priority of the intended access request.

8. The method of claim 7, in which the first backoff time value is determined in accordance with information in the subheader.

9. The method of claim 1, in which the power value is set to a first value in case of a first priority of the intended access request, and is set to a second value larger than the first value in case of a second priority of the intended access request higher than the first priority.

10. The method of claim 1, in which the priority determination is made in the network node in accordance with connectivity maintenance considerations regarding the connection between the wireless device and the network node, wherein a first priority can be assigned in case of a handover of a standing connection of the wireless device from a serving node to a new node or in case of recovering an earlier connection of the wireless device to a node, and a second priority lower than the first priority can be assigned in other cases.

11. The method of claim 1, in which the priority determination is made in the wireless device in accordance with one or more of
application layer information,
connectivity maintenance information,
quality of service information,
statistical information on the likelihood of access contention.

12. The method of claim 3, wherein the initial backoff time value is set in correlation with at least one other assigned backoff value, particularly in accordance with a backoff value assigned for a subsequent access try.

13. A wireless device for wireless accessing a node of a radio access network, comprising:
means for launching a first access try to a node of the network through a wireless access channel provided by the node,
means for, if the first access try fails, launching by the wireless device a second access try to a network node through a wireless access channel after expiry of a second backoff time,
characterized in comprising
means for setting the second backoff time in accordance with a priority value applying to the second access try;
wherein sending power of the first access try and/or of the second access try is set or determined in accordance with a priority value applying to the second access try.

14. The wireless device of claim 13, wherein launching the first access try by the wireless device is made after expiry of a first backoff time set in accordance with load considerations at the node, and wherein the first access try may be an access try launched before the mobile device received individualized messaging from the network node.

15. The wireless device of claim 13, wherein,
the access channel is a contention based random access channel, or
the access try comprises sending a preamble from the mobile device to the network node.

16. The wireless device of claim 13, wherein
an initial backoff time is a time larger than 0 ms or 1 ms or 2 ms or 5 ms or 10 ms or 20 ms or 50 ms, and/or smaller than 500 ms or 200 ms or 100 ms or 50 ms;
and/or wherein
a backoff multiplier is, for prioritized access requests a factor larger than 0 or larger than 0.1 or larger than 0.2 or larger than 0.5, and/or smaller than 1 or 0.5 or 0.2;
and/or wherein
the backoff multiplier is, for not prioritized access requests, a factor 1 or larger than 0.8 or 0.9 or 1,
and/or wherein
a power ramping step for a prioritized access request is at least 1.2 or 1.5 or 2 times that of a not prioritized access request.

17. The wireless device of claim 13, wherein a backoff time is adjusted in a mobile device with respect to at least one of factual circumstances, particularly a factual readiness of the mobile device to send out a message, or a synchronisation time pattern.

18. A non-transitory computer readable medium comprising a computer program, when executed on a processor of a device, causes the device to perform:
a.) transmitting a first random access preamble,
b.) setting a backoff multiplier,
c.) after receiving a random access response on the transmission of the first random access preamble, if the received random access response includes a backoff indicating subheader, determining a first backoff time value (btv1) in accordance with information in the subheader, determining a second backoff time value (btv2) by multiplying the first backoff time value and the backoff multiplier, and
d.) transmitting a second random access preamble under observance of the second backoff time value (btv2),
the method further comprises the following steps performed in the wireless device:
e.) in a step of initializing the transmission of a random access preamble from the wireless device to a network node, setting a power value, and
f.) transmitting a random access preamble under observance of the power value.

* * * * *